Oct. 27, 1959
L. H. MAGOR
2,910,322
CONSTRUCTION OF VEHICULAR BODIES
Filed July 8, 1957
3 Sheets-Sheet 1
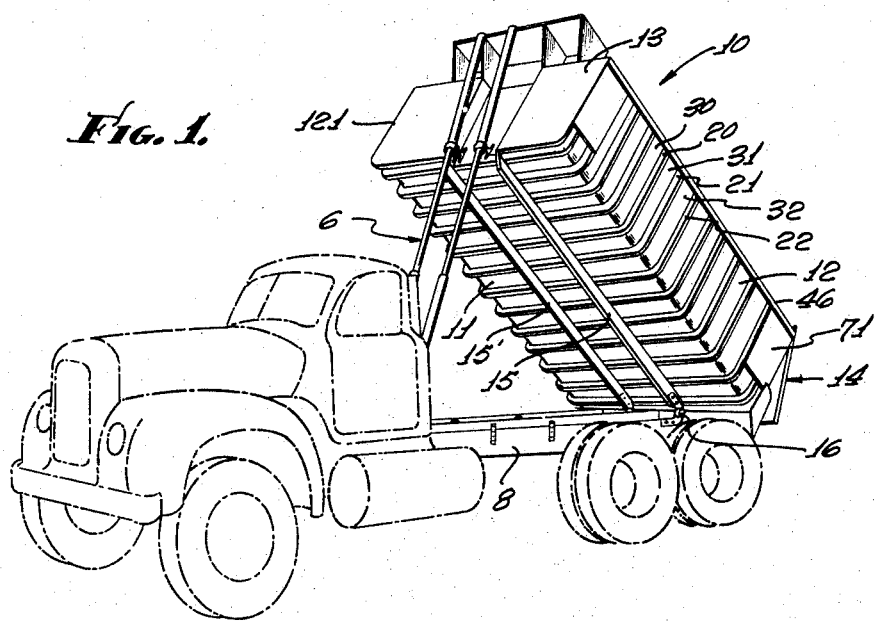
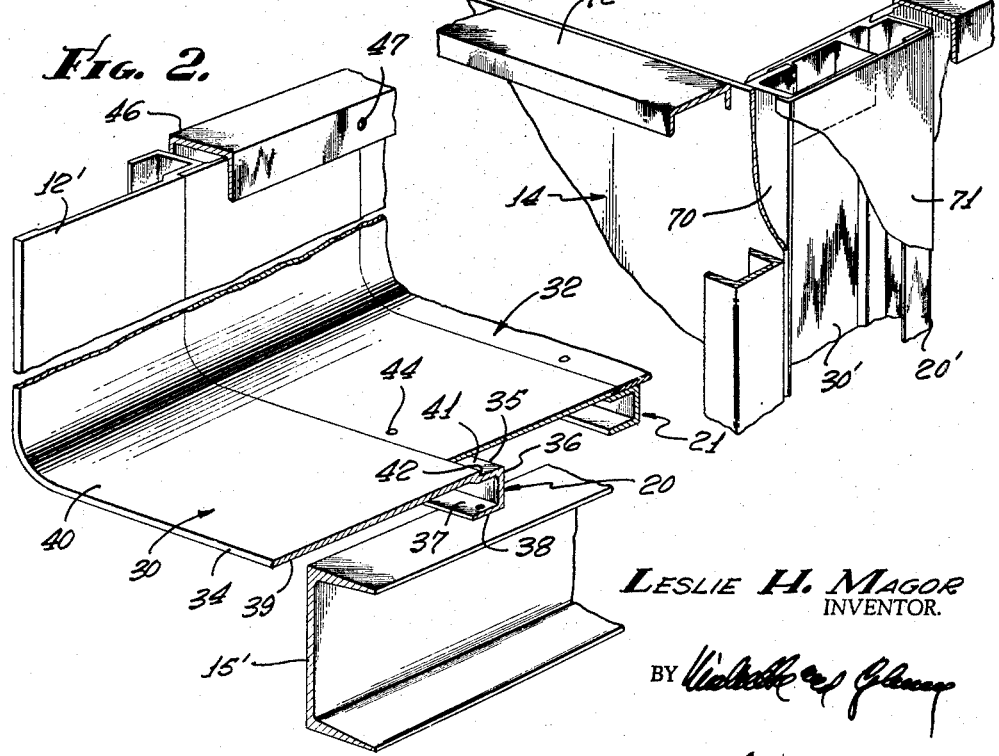
LESLIE H. MAGOR
INVENTOR.
BY
ATTORNEYS.

Oct. 27, 1959 L. H. MAGOR 2,910,322
CONSTRUCTION OF VEHICULAR BODIES
Filed July 8, 1957 3 Sheets-Sheet 2

INVENTOR.
LESLIE H. MAGOR
BY
ATTORNEYS.

Oct. 27, 1959  L. H. MAGOR  2,910,322
CONSTRUCTION OF VEHICULAR BODIES
Filed July 8, 1957  3 Sheets-Sheet 3

LESLIE H. MAGOR
INVENTOR.

BY
ATTORNEYS.

United States Patent Office 2,910,322
Patented Oct. 27, 1959

2,910,322

CONSTRUCTION OF VEHICULAR BODIES

Leslie H. Magor, San Marino, Calif., assignor to Aluminum Body Corporation, Montebello, Calif., a corporation of California Application July 8, 1957, Serial No. 670,484

9 Claims. (Cl. 296—28)

This invention relates to the construction of vehicular bodies such as dump trucks, large enclosed truck and trailer bodies, vans, box cars, etc., in which various materials and commodities can be transported. The present invention is particularly directed to the manufacture of such vehicular bodies in a rapid and facile manner from ribbon-like, extruded metal modular elements provided with integral reinforcing and connecting ribs whereby a variety of different bodies, different in length, size, shape, arrangement and accessories, with or without roofs, may be manufactured. The present construction results in a lightweight, durable and strong structure which is readily cleaned.

Although vehicular bodies have been made from metal sheets heretofore, the construction employed utilized a great variety of channels, angle irons, hat sections, sheets, corner posts, rib rails, etc., and the assembly of these various structural elements required cutting of many pieces to exact size, the drilling and punching of an excessive number of rivet holes, the exercise of extreme care and accuracy in the placement of such rivet holes and the use of literally thousands of rivets in the manufacture of a single body. These various operations had to be carried out in a properly equipped plant with highly skilled labor. Because of the bulk of a completed van or truck body, it is not feasible to ship completed bodies to a distant purchaser or user and therefore a manufacturing plant is actually limited to a relatively small area capable of being economically supplied with truck bodies, vans, etc., manufactured by the plant.

The present invention eliminates the multitude of different shapes, forms and elements heretofore employed and instead uses a modular element capable of being employed in the production of a great variety of vehicular bodies, vans, dump trucks, etc., with but few additional structural shapes or elements. Moreover, the present invention contemplates a mode of construction which eliminates the necessity of using the numerous rivets or other fastening devices, which insures accuracy during assembly, which employs prefabricated end sections or panels and which permits all of the elements of a van or dump truck body to be shipped to a distant location in the form of a compact, nested package. By reason of the simplified construction hereinafter disclosed, the elements of such package may be readily assembled by a mechanic of reasonable skill in a rapid manner without the necessity of employing specialized labor or equipment. As a result, the commercially effective range of a central manufacturing plant is greatly expanded and smaller more distant cities and prospective purchasers and users may avail themselves of the manufacturing plant's products.

Generally stated, the construction hereinafter disclosed in detail employs ribbon-like elements of extruded metal, such element consisting of a relatively flat body provided with a reinforcing rib or web integral with the body and extending outwardly therefrom along or adjacent to the longitudinal margin of the body portion. This ribbon-like element is provided with a seat adapted to receive the longitudinal edge of an adjacent ribbon-like element. The ribbon-like elements are then formed or bent so that a single element may constitute a section of floor and sections of wall integral therewith. Each element is of appreciable width and upon being connected together in interlocked relation with the terminal elements connected to suitable end panels, a complete vehicular body is obtained.

The construction of the present invention permits the use of hard, tough but lightweight aluminum alloys thereby giving rise to vehicular bodies which are of light weight and capable of carrying greater pay loads with less upkeep for the prime mover.

It is an object of the present invention therefore to disclose and provide a new and effective construction for vehicular bodies.

Another object of the invention is to disclose and provide a vehicular body largely composed of ribbon-like elements of extruded metal, each element including an integral reinforcing rib and means for interconnecting adjacent elements.

A further object of the invention is to provide a mode of construction for vehicular bodies whereby the number of different elements is materially reduced from prior practice and all of the essential elements of a vehicular body may be shipped in disassembled, compact form to a distant location where they can be readily combined to form a completed body.

These and various other uses, objects, advantages and details of the present invention will be readily appreciated from a consideration of the appended drawings of exemplary forms.

In the appended drawings:

Fig. 1 is a perspective view of a dump truck body in tilted position as it would appear upon a truck shown in dotted lines.

Fig. 2 is an enlarged perspective view, partly broken away, of the relationship between the essential structural elements employed in a dump truck body of the character illustrated in Fig. 1.

Fig. 3 is an end view of an end gate assembly on a dump truck body.

Figure 4:
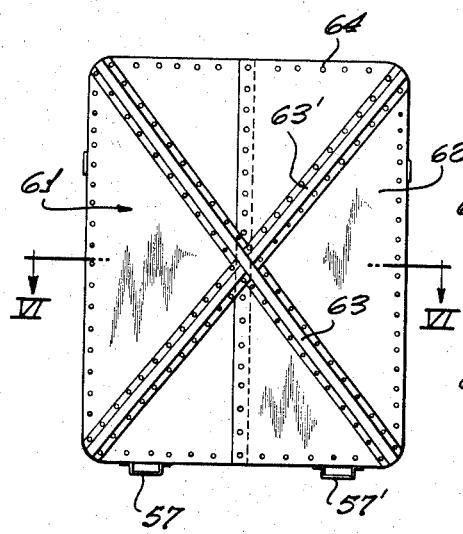
Fig. 4 is an end view of an enclosed truck body, box car or large transport unit.

The dump truck body 10, illustrated in Fig. 1, is generally rectangular in plan and includes the floor 11, side walls 12 and 12', a closed end panel 13 and a gated end panel 14. Longitudinally extending bottom members or longerons 15 and 15', connected to the floor 11 are generally pivotally mounted to the chassis of the truck 8 upon trunnions or pins as indicated at 16. Suitable hydraulic or other lift means are generally provided for controllably moving the entire dump truck body 10 from its normal lowered position upon the chassis of the truck 8 into a tipped or tilted position illustrated in Fig. 1. Exemplary telescopic hydraulically actuated lift means are diagrammatically shown at 6. Details thereof are well known in the art and need not be described here.

It will be noted that in accordance with the present invention, the floor 11 and the sides 12 and 12' are made from a series of interlocking extruded metal elements, each provided with its own integral reinforcing web or rib. Each of the ribs 20, 21 and 22, for example, is associated with a ribbon-like element having a body portion 30, 31 and 32 respectively.

Fig. 2 more clearly illustrates the construction employed and represents the arrangement of ribbon-like elements having body portions 30, 31 and 32. It will be noted that the element 30 is provided with a longitudinal edge 34 of predetermined configuration and a parallel longitudinally extending margin 35. Extending outwardly from such margin is the reinforcing rib or web 36 shown provided with a lip or head 37 presenting an outer face 38 which is spaced from but parallel to the outer face 39 of the body 30. The body portion 30 is provided with a planar, smooth, inner face 40. Adjacent the margin 35 there is provided a step or seat 41 as well as a shoulder 42 having a configuration complementary to the longitudinal edge 34 and being adapted to cooperatively engage and receive the beveled, longitudinal edge of the element 31. The element 31 is identical to the element 30.

Each of the ribbon-like elements, such as 30, 31 and 32, is cut to desired length and then die-formed, stretch-pressed or otherwise bent to form an intermediate section constituting the floor 11 and upstanding sections forming the side walls 12 and 12'. Preferably, the corners are bent on an adequate radius to provide a cove which subsequently facilitates the thorough and complete dumping of the truck and cleaning operations.

It is to be noted that preferably a single rib or reinforcing web, such as 36, is formed integrally with the body portion of the element and, as shown in the illustrated form, the web is provided with a head 37. Moreover, the reinforcing rib is preferably located at or near the longitudinal margin of the modular element and thus provides reinforcing adjacent the zone at which adjoining or overlapping modular elements (such as 31) are connected. This increases the stability and strength of the assembly and simplifies fabrication. Relatively few flathead rivets, such as 44, may be used to increase the strength attained by the rigid interlock of the various modular elements making up the floor and side walls of a completed dump truck, gondola, van or the like. If desired, a thin layer of rubber-like or other waterproof plastic composition may be applied to the seat or step 41 at the time adjacent elements are connected. It will also be noted that by providing a suitably beveled or formed edge 34 and a shoulder 42 of similar configuration, good interlock is attained.

These various modular elements are generally positioned upon two or more longerons or longitudinal supporting beams, such as 15 and 15', and connected thereto by means of suitable bolts or rivets passing through the lip 37 of the reinforcing web 36. End panels, such as the prefabricated end structure 13 and gate structure 14 are also attached to the ends of the subassembly. Fig. 3 is a perspective, partly broken-away, of an upper corner of the end gateside juncture, the usual hinge at such corner being not shown. Extrusion 30' has an angle iron 70 attached along its edge and a panel 71 is connected to 70 and to the rib 20' to provide a firm foundation for one hinge element, the companion hinge element being connected to the frame 72 of the end gate 14.

The upstanding edge of each side wall 12 and 12' is preferably capped as by means of a continuous channel 46. A single rivet, such as 47, may be used to join adjacent modular elements and the capping channel 46 at each meeting of these structural components.

It is evident that, when each of the ribbon-like elements is made from an aluminum alloy, the completed dump truck body is extremely light and capable of carrying a greater pay load than bodies made of steel in the usual manner. Moreover, a builder can make bodies of any desired length, width and height with the same structural shapes, and all of the component parts (such as end panels, gates, preformed body members, capping channels, etc.) can be shipped to distant locations and readily assembled with the minimum of tools and prior experience of the workmen employed.

Figure 10:
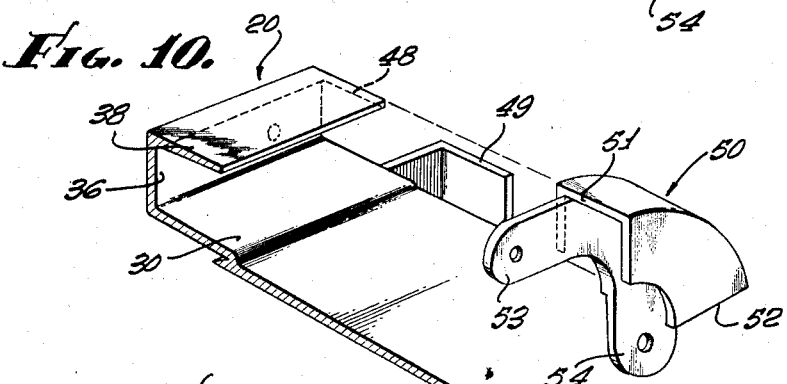
Fig. 10 is a perspective and exploded view illustrating one form of corner filler and connector for use in elements formed as shown in Fig. 9.

It may be noted that when elements of aluminum alloy are employed the cove or corner is of adequately large radius, the elements can be stretch-pressed and bent by resorting to the well known annealing procedure, the outer rib and head being capable of stretching about 20% beyond original length. When sharper corners or coves are desired, a procedure such as is shown in Figs. 9 and 10 may be used.

Figure 9:
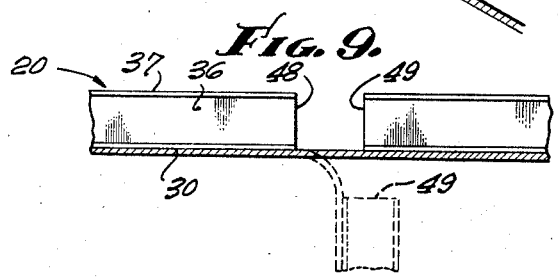
Fig. 9 is a fragmentary view illustrating one method of facilitating the bending or forming of the element.

As shown in Fig. 9, a portion of the outstanding rib 20, including the web 36 and head 37, is removed from the planar body portion 30, to form opposing rib end faces 48 and 49. These ends are preferably spaced a distance equal to the length of the arc to which the element is then bent. Upon bending or forming the body portion 30 into the position shown in dash lines, the rib faces 48 and 49 lie in planes at right angles to each other. A suitable corner connector or reinforcement is then fitted and attached. Fig. 10 illustrates one form of cast connector 50 presenting end faces 51 and 52 adapted to abut rib end faces 48 and 49 respectively and offset connecting arms 53 and 54 extending at 90° to each other and adapted to contact the inner surface of web 36 adjacent the rib end faces 48 and 49. Each of the arms 53 and 54 is then connected, as by riveting to the web portions to rigidly hold such web portions in position and bridge the gap between rib ends 48 and 49.

In order to facilitate understanding the numerals 20, 21 and 22 applied heretofore to the integral reinforcing ribs of metallic, ribbon-like elements 30, 31 and 32 shall be also used in identifying the ribs of similar elements in the subsequent figures and modifications.

Figs. 4 to 8 illustrate a roofed vehicular body, such as a box car body or truck body. The lower portion of the sides and the floor are composed of formed, nested, transversely extending extruded elements similar to those heretofore described in connection with the dump body; the upper portion of the sides and the roof are composed of similar elements. These lower and upper side wall portions are received in and connected to H-beam extending horizontally along each side. End panels complete the body.

Figure 5:
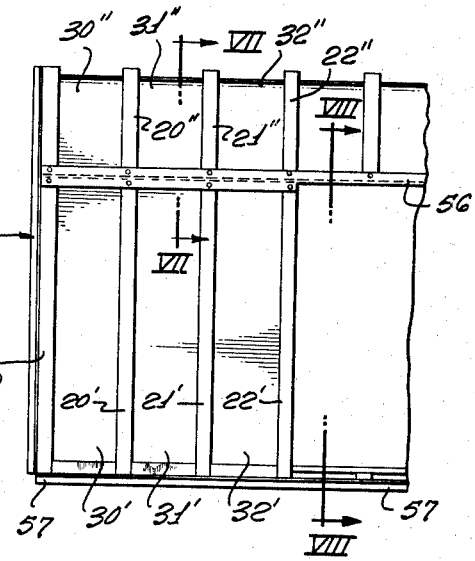
Fig. 5 is a side view of one end of the enclosed body shown in Fig. 4.
Figure 7:
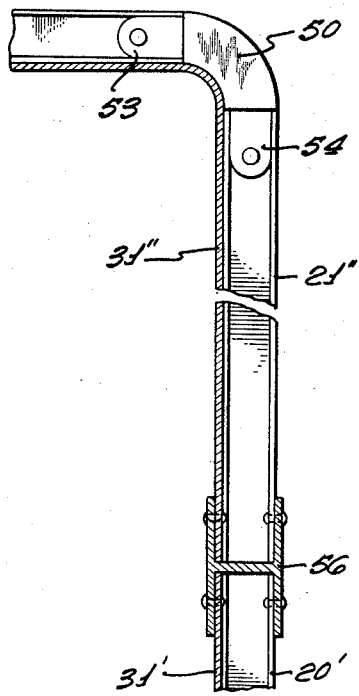
Fig. 7 is an enlarged vertical section taken along the plane VII—VII of a portion of Fig. 5.
Figure 8:
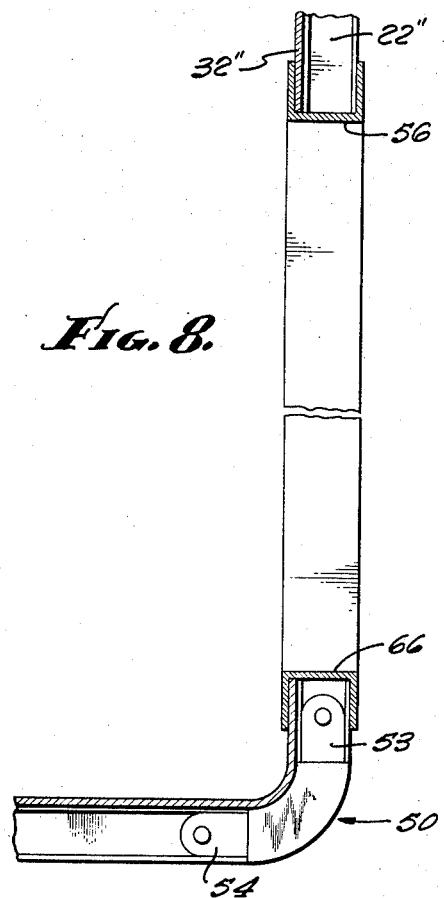
Fig. 8 is an enlarged vertical section taken along plane VIII—VIII in Fig. 5.

In Fig. 5, the lower side wall portions and floor are formed of elements such as 30' and 31' having outstanding ribs 20' and 21'. The roof and upper side wall portions are of preformed elements 30'', 31'' and 32'' having ribs 20'', 21'' and 22''. The upper edges of the lower side wall portions are received in the H-beam 56 and the lower edges of the upper side wall portions are also received in the opposite portion of the H-beam, as best shown in Fig. 7. The edge portions of these lower and upper wall portions are received in, aligned by and connected to the H-beam by rivets, welding or any other suitable manner. The assembly thus formed may rest upon and be supported by suitable longitudinally extending beams such as 57 and 57' connected to the heads of the outstanding ribs under the floor portion.

Figure 6:
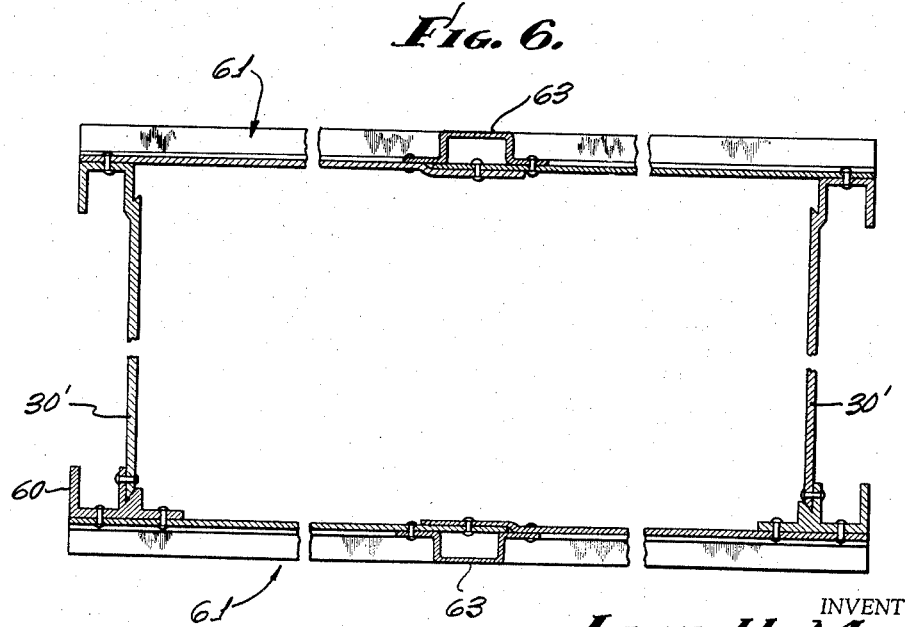
Fig. 6 is an enlarged sectional view, taken along the plane VI—VI in Fig. 4, illustrating an exemplary manner of connecting end panels to the sides of the body.

The ends of the such covered body or box car may be provided with any suitably designed end panels. In order to permit identical end panels to be used, the tapered longitudinally extending edges of the body element 30' may be received in and connected to a channel element 60, also preformed to the cove corners and having its ends attached to H-beam 56. A typical end panel 61 may be composed of one or two flat aluminum alloy plates 62 carrying suitable diagonal reinforcing hat section elements 63 and 63'. The entire end panel 61 is riveted or otherwise connected to the webs of the outstanding ribs or channel element 60 as indicated by the row of rivets 64. In Fig. 6 the end panel 61 at the top of the figure is shown attached directly to the web or rib integral with an extruded plate element, whereas the end panel in the lower part of the figure is shown connected to the channel element 60 which is, in turn, connected to plate element 30'.

The present construction is extremely flexible and capable of many changes, modifications and adaptations for various specific uses of the final body. It will be evident that the entire vehicular body shown in Figs. 4 and 5, for example, can be easily lifted by a crane rig having hooks engaging the H-beams 56, and the body then skidded into position upon beams 57, 57'. The body can therefore be used for shipping machinery or other goods which have to be well protected during shipment. When the construction is used for box cars, side doors may be provided by simply terminating the side wall portions of two or more of the extruded elements (such as 32' in Figs. 5 and 8) at about or slightly above floor level, and capping such terminated end portions with a suitable threshold member 66. The downwardly extending flanges of H-beam 56 may be cut off, in whole or in part, in the doorway opening so provided, and any suitable type of door can be hung or positioned for selective closure of such door opening.

Again attention is called to the utility of the ribbon-like extruded, light weight elements and the great variety of vans, receptacles, truck bodies, box cars and other objects which can be readily made therefrom. Smooth, flush interious, ribbed and rigidly trussed exteriors, simplicity of assembly, and few standard structural elements are some of the many advantages which flow from the construction and invention here disclosed. All changes coming within the scope of the appended claims are embraced thereby, since the specific forms shown in the drawings are exemplary only and the invention is not limited thereto.

I claim:

1. In a metallic body for transportation of materials the combination of: a plurality of elongated elements of extruded metal, said elements lying in adjacent planes transverse to said body and in interlocking relation, each element comprising a ribbon-like body portion provided with a planar inner face, an outer face and a headed rib extending from the outer face but integral with the body portion; end sections of each such element being bent to form an intermediate floor section and integral opposing wall sections; one edge of each of said ribbon-like elements abutting and engaging an edge of an adjoining element to present a substantially smooth floor and side walls; a load bearing member connected to the headed ribs beneath the floor and interconnecting said ribs and elements; and a member covering and interconnecting upstanding ends of end sections of said elements.

2. A metallic body for transportation of materials as stated in claim 1 wherein each elongated element is provided with a longitudinal edge and a longitudinal margin portion, a step and a shoulder formed in the inner face of the body portion adjacent the longitudinal margin and adapted to be overlapped by and support the longitudinal edge of another adjacent element.

3. A readily assembled vehicular body including a smooth floor and side walls comprising: a plurality of elongated elements of extruded metal, said elements lying in adjacent planes transverse to said body and in interlocking relation with each other, each element comprising a ribbon-like portion provided with a planar inner face, an outer face and a headed rib extending from the outer face and integral with the body portion; end sections of each such element being bent to form wall sections integral with an intermediate floor section; an edge of each said ribbon-like element overlapping, abutting and engaging an edge of an adjoining element to present a substantially smooth floor and side walls; a load bearing member interconnecting the headed ribs beneath the floor; and a longitudinal capping member covering and connecting upstanding ends of end sections of said elements.

4. A readily assembled vehicular body as stated in claim 3 wherein each of the headed ribs includes a web lying in a plane perpendicular to the plane of the body portion.

5. A readily assembled dump truck body of rectangular plan, comprising: a rear end gate portion, a closed end portion, side walls and a smooth floor, said side walls and floor being composed of a plurality of transversely extending elongated elements of extruded metal, each element consisting of a ribbon-like body portion provided with a planar inner face, an outer face and a headed rib extending from the outer face and integral with the body portion; end portions of each such element being bent to form an intermediate floor section and integral opposing wall sections; one edge of each of said ribbon-like elements overlapping, abutting and engaging an edge of an adjoining element to present a substantially smooth floor and side walls; a load bearing member connecting to the headed ribs beneath the floor and interconnecting said ribs and elements; and a member covering and interconnecting the upstanding ends of said elements and extending between said end gate portion and closed end portion.

6. A readily assembled vehicular body as stated in claim 5 wherein each elongated element is provided with a longitudinal edge and a longitudinal margin portion, a step and a shoulder formed in the inner face of the body adjacent the longitudinal margin, said step and shoulder being adapted to receive and support a longitudinal edge of another adjacent element.

7. A readily assembled vehicular body as stated in claim 5 wherein each of the headed ribs includes a web lying in a plane perpendicular to the plane of the body portion and extending longitudinally thereof, said rib being provided with an integral lip presenting an outer face lying in a plane parallel to but spaced from the outer face of the body portion.

8. A metallic body for the transportation of materials comprising: a lower assembly formed from a plurality of elongated elements of extruded metal lying in adjacent planes transverse to said body and in interlocking relation, each of said elements consisting of a ribbon-like body provided with a planar inner face, an outer face and a headed rib extending from the outer face and integral with the body portion; end sections of each such element being bent to form an intermediate floor section and integral, opposing wall section; one edge of each of said ribbon-like elements abutting and engaging an edge of an adjoining element to present a substantially smooth floor and side walls; an upper assembly also comprising a plurality of elongated elements of extruded metal lying in adjacent planes transverse to said body and in interlocking relation, each element consisting of a ribbon-like body portion provided with a planar inner face, an outer face, and a headed rib extending from the outer face and integral with the body portion; end sections of each of said elements being bent to form an intermediate roof section and integral, opposing wall sections; a load bearing member connected to the headed ribs beneath the floor; and a member extending longitudinally of the body and receiving and connected to the ends of the end sections of the lower and upper assemblies; and transversely extending end panels conected to the ends of said upper and lower assemblies.

9. In a vehicular body: a continuous ribbon-like element of extruded metal, said element comprising a body portion provided with a planar inner face, an outer face and a headed rib extending from the outer face and integral to the body portion; said headed rib including a web lying in a plane perpendicular to the body portion and extending from the outer face thereof adjacent a longitudinal margin of the element; the inner face being provided with a step and shoulder adjacent such longitudinal margin, said step and shoulder being adapted to receive a longitudinal edge of another adjacent ribbon-like element; each end section of the ribbon-like element being bent into a plane substantially at right angles to an intermediate section of the element whereby said end sections present opposing planar faces, said element presenting smooth, concave inner coves where said element is bent, and the integral headed rib and web are absent from the outer surface of the element in the region of the coves; and a reinforcing connector having a pair of arms extending at 90° to each other and connecting the headed rib and web on an end section with the headed rib and web on the intermediate section of said bent element.

References Cited in the file of this patent

UNITED STATES PATENTS

| | | |
|---|---|---|
| 1,515,996 | Buchanan | Nov. 18, 1924 |
| 1,836,723 | Muchnic | Dec. 15, 1931 |
| 1,957,497 | Galanot | May 8, 1934 |
| 2,490,532 | Maxon | Dec. 6, 1949 |
| 2,502,703 | Chaplin | Apr. 4, 1950 |
| 2,585,976 | Teeter | Feb. 19, 1952 |
| 2,591,654 | Dean | Apr. 1, 1952 |
| 2,773,718 | Bohlen | Dec. 11, 1956 |

FOREIGN PATENTS

| | | |
|---|---|---|
| 794,092 | France | Dec. 2, 1935 |